United States Patent
Morschel et al.

(10) Patent No.: US 10,270,373 B2
(45) Date of Patent: Apr. 23, 2019

(54) METHOD FOR CONTROLLING THE CURRENT OF AN INDUCTIVE LOAD

(71) Applicant: Continental Teves AG & Co. oHG, Frankfurt (DE)

(72) Inventors: Dirk Morschel, Ober-Mörlen (DE); Jürgen Müller, Friedrichsdorf (DE); Axel Schmitz, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/775,166

(22) PCT Filed: Nov. 4, 2016

(86) PCT No.: PCT/EP2016/076661
§ 371 (c)(1),
(2) Date: May 10, 2018

(87) PCT Pub. No.: WO2017/089094
PCT Pub. Date: Jun. 1, 2017

(65) Prior Publication Data
US 2018/0342963 A1    Nov. 29, 2018

(30) Foreign Application Priority Data
Nov. 24, 2015    (DE) .................. 10 2015 223 151

(51) Int. Cl.
*H02P 27/08*    (2006.01)
*H02P 1/18*    (2006.01)
(Continued)

(52) U.S. Cl.
CPC ................ *H02P 1/18* (2013.01); *H02M 1/08* (2013.01); *H02M 1/36* (2013.01); *H02P 27/08* (2013.01)

(58) Field of Classification Search
CPC ........ H02M 1/36; H02M 3/156; H02M 3/335; H02P 7/00; H02P 1/18; H02P 27/08
(Continued)

(56) References Cited

U.S. PATENT DOCUMENTS 5,075,608 A  * 12/1991  Erdman .................. F23N 3/082
                                                            318/400.22
7,180,279 B2    2/2007  Novak
(Continued)

FOREIGN PATENT DOCUMENTS

DE    102004022947 B3    12/2005
DE    102010063744 A1     6/2011
DE    102014208066 A1    10/2015

OTHER PUBLICATIONS

English translation of the Written Opinion for International Application No. PCT/EP2016/076661, dated Feb. 9, 2017, 4 pages.
(Continued)

*Primary Examiner* — Rina I Duda
(74) *Attorney, Agent, or Firm* — RatnerPrestia

(57) ABSTRACT

A method for pulse-modulated current control of an inductive load current. A first operating mode is implemented when a change in current setpoint value is effected. An initial duty cycle of the pulse modulation is determined and used to operate the inductive load in a second operating mode. In the first operating mode, a switching state of at least one switching element is set depending on whether a current setpoint value of the load current is higher or lower than a current setpoint value of a directly preceding cycle. The switching state is retained until a current limit value is reached and then switched over. The switching state of the switching element is switched over multiple times to generate a prescribed number of periods, and the duty cycle of
(Continued)

the pulse modulation is determined based on at least a portion of the prescribed number of periods.

8 Claims, 4 Drawing Sheets

(51) Int. Cl.
*H02M 1/08* (2006.01)
*H02M 1/36* (2007.01)

(58) Field of Classification Search
USPC .................................................. 318/599, 811
See application file for complete search history.

(56) References Cited

U.S. PATENT DOCUMENTS 8,792,256 B2 * 7/2014 Genannt Berghegger ...................
H02M 3/335
326/82
2013/0181648 A1 * 7/2013 Dontha ...................... H02P 7/00
318/434

OTHER PUBLICATIONS

German Search Report for German Application No. 10 2015 223 151.8, dated Jun. 1, 2016, including partial English translation—9 pages.
International Search Report and Written Opinion for International Application No. PCT/EP2016/076661, dated Feb. 9, 2017—7 pages.

* cited by examiner

METHOD FOR CONTROLLING THE CURRENT OF AN INDUCTIVE LOAD

CROSS REFERENCE TO RELATED APPLICATIONS

This application is the U.S. National Phase Application of PCT International Application No. PCT/EP2016/076661, filed Nov. 4, 2016, which claims priority to German Patent Application No. 10 2015 223 151.8, filed Nov. 24, 2015, the contents of such applications being incorporated by reference herein.

FIELD OF THE INVENTION

The invention relates to a method for the current control of a load current of an inductive load and to an electronic circuit arrangement.

BACKGROUND OF THE INVENTION

In modern motor vehicles, a multiplicity of electrical or electronic devices comprising inductive loads, for example valves, electric motors or relays, are actuated in a pulse-width-modulated manner by means of driver stages, usually switching transistors. PWM control can therefore be used, for example, to operate an electric motor of a starter for the purpose of starting an internal combustion engine or for pressure build-up in a brake installation. In conventional starting methods, a comparatively high switch-on current has to be provided by the vehicle battery, which can lead to a reduction in the terminal voltage of the vehicle battery.

The generic DE 10 2010 063 744 A1, which is incorporated by reference, solves this problem by virtue of a current limiting resistor being connected in series with the inductive load for the purpose of limiting the current during the starting phase by means of a FET transistor, with the result that a base current flows when the FET transistor is in the conductive state. A series circuit composed of a further PWM-controlled FET transistor and a further resistor is connected in parallel with the series circuit composed of the FET transistor and the current limiting resistor. The PWM control of said further FET transistor is used to control the current through the load, wherein, in the conductive state of said further FET transistor, the path with the current limiting resistor is shorted and the maximum current through the second resistor is limited. A disadvantage of this procedure is the high power loss generated during operation of the inductive load as a result of the resistors provided for limiting the current.

This disadvantage is overcome by the generic DE 10 2014 208 066.5, which is incorporated by reference, which has not been published as of the effective date of the present application, which describes a method for pulse-width-modulated current control of a load current of an inductive load, in which a current actual value is determined, a control difference from the current actual value and a current setpoint value is determined, the control difference is identified as an input value of a control algorithm for calculating a duty factor of the pulse-width modulation, and a power switch connected in series with the inductive load is actuated at the identified duty factor. The inductive load is transferred into an operating mode by means of a starting mode in that, for the purpose of carrying out the starting mode, the control algorithm identifies the current setpoint values, associated duty factors and a current target value based on a ramp function and controls the load current up to the current target value in accordance with the ramp function, and, for the purpose of carrying out the operating mode following the starting mode, the control algorithm identifies the duty factors based on an upper and a lower current setpoint value in such a way that, proceeding from the current target value, the load current is controlled between the upper and lower current setpoint value. However, this procedure cannot be applied to all applications on account of the ramp-shaped increase and the time delay associated therewith.

SUMMARY OF THE INVENTION

An aspect of the invention is a method mentioned at the beginning by means of which a shortened switch-on time and/or length of time for adapting to a changed setpoint current value is made possible and at the same time high currents can be prevented on account of said change and which is simple to implement.

An aspect of the invention describes methods for the pulse-modulated current control of a load current of an inductive load by means of at least one switching element for switching the load current, in which a first operating mode for operating the inductive load is implemented when a change in the current setpoint value has been effected, wherein, in the first operating mode, an initial duty cycle of the pulse modulation is determined, said duty cycle being used to operate the inductive load in a second operating mode, and, in the first operating mode, a switching state of the switching element is set depending on whether a current setpoint value of the load current is higher or lower than a current setpoint value of a directly preceding cycle, wherein the switching state is retained until a current limit value is reached and is switched over when the current limit value is reached, wherein the switching state of the switching element is switched over multiple times to generate a prescribed number of periods, and the duty cycle of the pulse modulation is determined based on at least a portion of the prescribed number of periods, said duty cycle being used as the initial duty cycle for the second operating mode. An aspect of the invention therefore advantageously makes a shortened switch-on time and/or length of time for adapting to a changed setpoint current value possible and at the same time makes high currents possible on account of said change and at the same time high currents during switch-on of the inductive load can be prevented. A comparatively simple implementation is also possible. A current limit value is deemed to be reached, in particular, when, in the event of an increasing current, for example when the current setpoint value is raised, the detected current actual value is greater than or equal to the current limit value and, in the event of a decreasing current, for example when the current setpoint value is lowered, the detected current actual value is less than or equal to the current limit value.

An average duty cycle is preferably determined based on at least the portion of the prescribed number of periods, said average duty cycle being used as the initial duty cycle for the second operating mode. As a result thereof, the duty cycle for the second operating mode can be determined and prescribed comparatively quickly using very simple means.

After a current limit value has been reached, a further change in the switching state of the switching element is preferably effected when a period duration of a respective period has elapsed. Depending on the technical implementation of the solution for switching over the switching state, "when a period duration has elapsed" can mean, for example, immediately before, during or after a switchover to a subsequent period.

According to an advantageous development of an aspect of the invention, the initial duty cycle for use in the second operating mode is calculated using an average length of time of at least one of the switching states of the switching element over at least a portion of the number of periods.

The initial duty cycle for use in the second operating mode is expediently calculated using an average switch-on time of the switching element over at least a portion of the number of periods.

A period duration of the periods is preferably prescribed by means of a timer. The timer is expediently a counter, which starts again after a prescribed maximum value has been reached. The maximum value of the counter is preferably a value that is dependent on the frequency of the pulse modulation or changes with said frequency.

According to one exemplary embodiment of an aspect of the invention, proceeding from an initial duty cycle identified in the first operating mode, the duty cycle during the second operating mode is prescribed taking into account at least one current limit value.

According to an exemplary embodiment, proceeding from an initial duty cycle identified in the first operating mode, the duty cycle during the second operating mode is prescribed taking into account an upper and a lower current limit value in such a way that the load current is controlled between the upper and lower current limit value.

According to a development of an aspect of the invention, in the second operating mode, a current actual value is determined, a control deviation from the current actual value and a current setpoint value is detected and the control deviation is used to calculate a duty factor of the pulse-width modulation.

According to an advantageous configuration of an aspect of the invention, a control pause period is provided after each control loop. After this control pause period, the current actual value is identified first, which is then used to perform another control intervention. The time of the control intervention is thus linked to the sampling time of the current signal.

The method according to an aspect of the invention is particularly preferably implemented substantially by means of software and can be executed, for example, in an FPGA.

An aspect of the invention furthermore describes an electronic circuit arrangement for the pulse-modulated current control of a load current of an inductive load comprising at least one switching element for switching the load current and a control circuit for actuating the switching element, wherein the circuit arrangement is configured to operate the inductive load in a first operating mode when a change in the current setpoint value has been effected, wherein, in the first operating mode, an initial duty cycle of the pulse modulation can be determined, said duty cycle being provided to operate the inductive load in a second operating mode, and, in the first operating mode, a switching state of the switching element is set depending on whether a current setpoint value of the load current is higher or lower than a current setpoint value of a directly preceding cycle, wherein the switching state is retained until a current limit value is reached and can be switched over when the current limit value is reached, wherein the switching state of the switching element is switched over multiple times to generate a prescribed number of periods, and the duty cycle of the pulse modulation is determined based on at least a portion of said periods, said duty cycle being used as the initial duty cycle for the second operating mode.

BRIEF DESCRIPTION OF THE DRAWINGS

Further preferred embodiments emerge from the following description of exemplary embodiments on the basis of figures.

In a basic illustration.

DETAILED DESCRIPTION OF THE PREFERRED EMBODIMENTS

In order to enable a short and simple description of the exemplary embodiments, identical elements are provided with the same reference signs.

Figure 1:
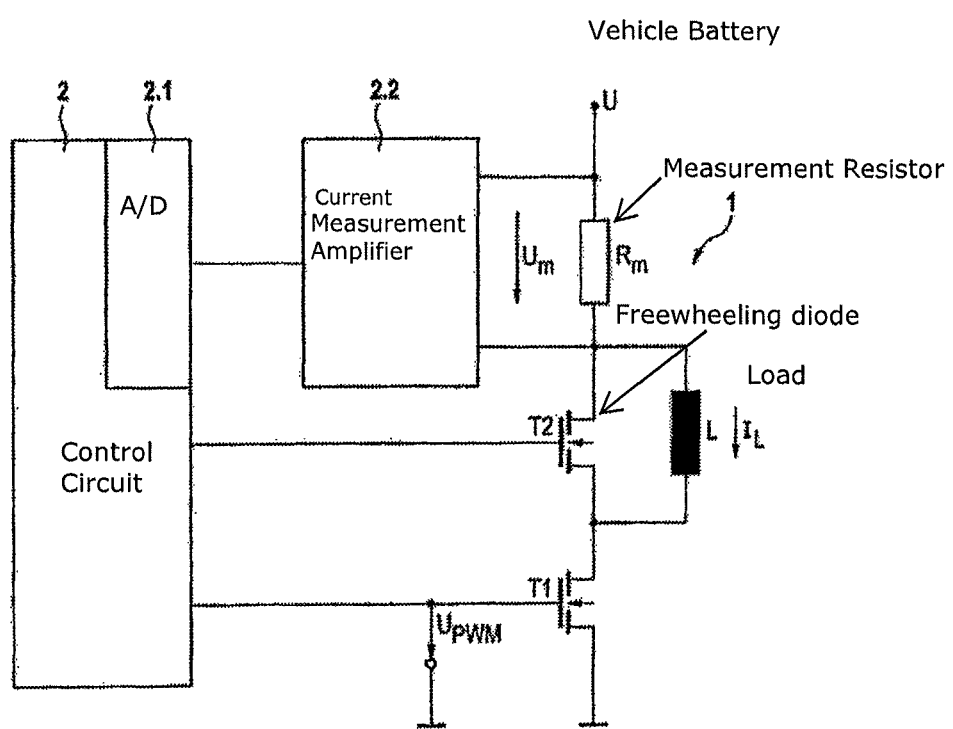
FIG. 1 shows a block circuit diagram of a circuit arrangement for controlling the current of an inductive load according to the method according to an aspect of the invention.

FIG. 1 shows a schematic illustration of a load circuit 1 having a valve coil for operating an electro-hydraulic or electro-pneumatic valve in a motor vehicle brake installation as inductive load L and a FET transistor T1 as load current switch connected in series with the load L, and a control circuit 2 for actuating the FET transistor T1 and executing the control method according to an aspect of the invention. To this end, a PWM voltage signal $U_{PWM}$, generated by the control circuit 2, is fed to the gate electrode of the FET transistor T1, the duty cycle (ratio of the pulse duration to the period duration) of which signal is adjusted according to the current requirement. A measuring resistor $R_m$ arranged in series with the load L is provided in the load current path, wherein the current actual value $I_{ACTUAL}$ of the load current $I_L$ is determined from the measuring voltage $U_m$, which is applied across the measuring resistor $R_m$, by means of a current measuring amplifier 2.2 and control circuit 2. The load circuit 1 comprising the series circuit composed of the FET transistor T1, the inductive load L and the measuring resistor $R_m$ is connected to a voltage supply U, for example a vehicle battery, wherein the FET transistor T1 is present, for example, in low-side arrangement. A further FET transistor T2 is connected in parallel with the inductive load L with respect to ground, said further FET transistor being able to be operated as a freewheeling diode by the control circuit 2.

According to this exemplary embodiment, the control circuit 2 has an A/D converter 2.1, which digitizes the amplified measurement signal output by the current measuring amplifier 2.2 for the purpose of processing by the control circuit 2.

Figure 2:
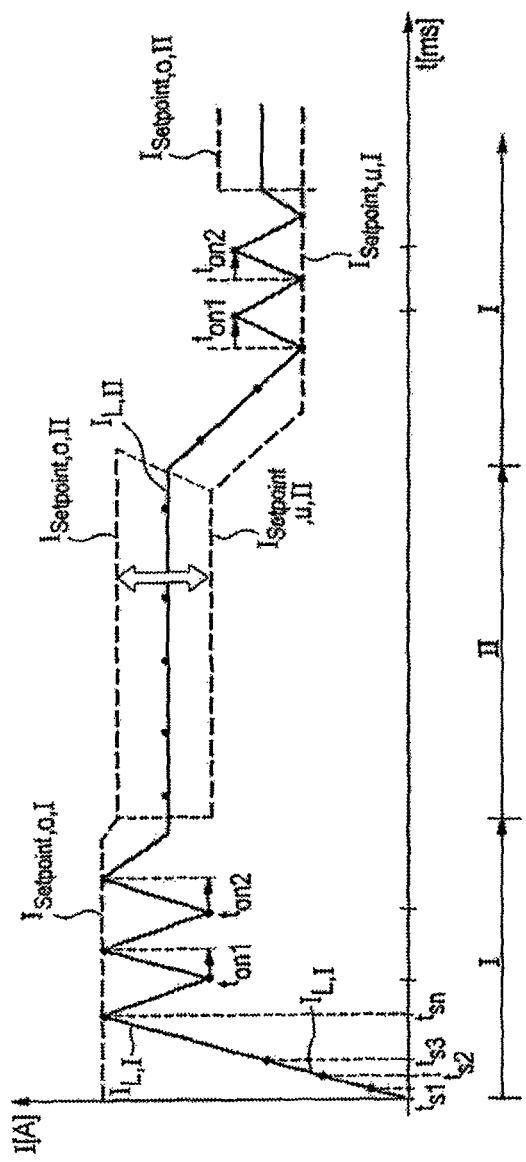
FIG. 2 shows a time/current graph for illustrating the temporal profile of the controlled current in the inductive load.
Figure 3:
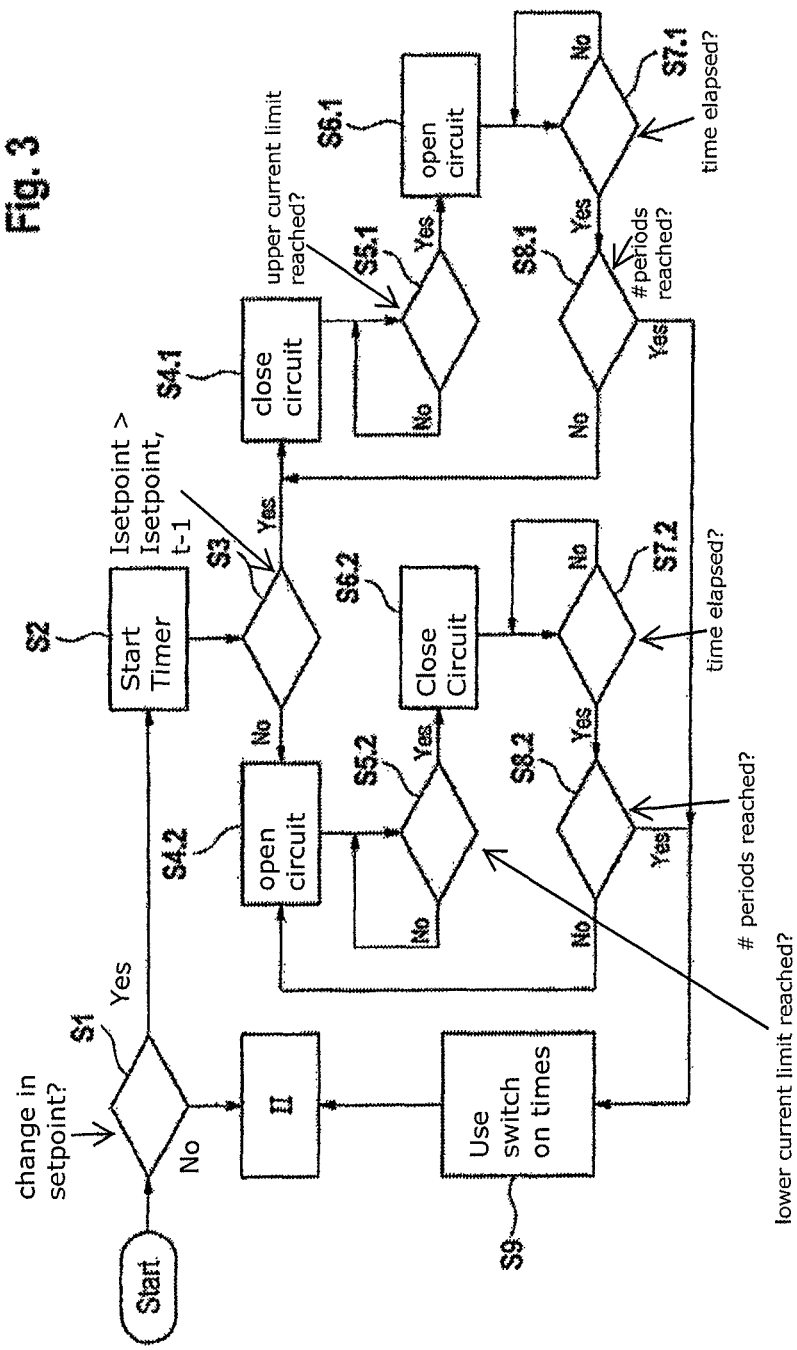
FIG. 3 shows a flow chart for explaining the calculation of the starting value of the duty cycle for the current control of the inductive load when the current setpoint value of the current changes during an operating mode I and FIG. 4 shows a flow chart for explaining the current control of the inductive load in an operating mode II.

The method according to an aspect of the invention for operating a valve coil L is explained in the following text based on the time/current graph according to FIG. 2 and the block circuit diagram and the flow chart according to FIGS. 3 and 4.

In general, the following holds true:

$$I = \frac{U}{R}DC \text{ or } DC = \frac{R}{U}I$$

-continued $$\text{where } DC = \frac{t_{on}}{t_{on} + t_{off}}$$

The duty cycle DC is influenced by the supply voltage U and the overall resistance R of the load circuit, in particular the resistance of the coil L and the measuring resistor $R_m$. Since these are variable in running operation, for example on account of temperature influences, a clear load current $I_L$ cannot be derived from a prescribed duty cycle (and vice versa).

The valve coil L is therefore energized in at least two phases or operating modes, wherein, upon a change in the current setpoint value $I_{SETPOINT}$ being determined, the load current $I_L$ is moved closer to the new current setpoint value $I_{SETPOINT}$ in an operating mode I according to the method steps explained with reference to FIG. 3. According to the exemplary illustration according to FIG. 2, the new current setpoint value $I_{SETPOINT}$ is higher than a current setpoint value $I_{Setpoint,t-1}$ of a preceding cycle, with the result that the load current $I_{L,I}$ is increased in the operating mode I. When an upper current limit value $I_{SETPOINT,o,I}$ of the operating mode I is reached or exceeded, no further actuation is carried out for a prescribed length of time, with the result that the load current $I_{L,I}$ decreases, wherein the actuation is subsequently continued until the upper current limit value $I_{SETPOINT,o,I}$ is reached, whereupon disconnection takes place again. By using the average switch-on time over a number N of periods, an average duty cycle $DC_{mean}$ is determined, wherein the period duration T can be prescribed by a timer, such as, for example, the maximum value of a counter:

$$DC_{mean} = \frac{\sum t_{on}}{T} \quad (1)$$

The load current $I_L$ for the operating mode II is adjusted based on the changed current setpoint value $I_{SETPOINT}$ by using the average duty cycle $DC_{mean}$.

Figure 4:
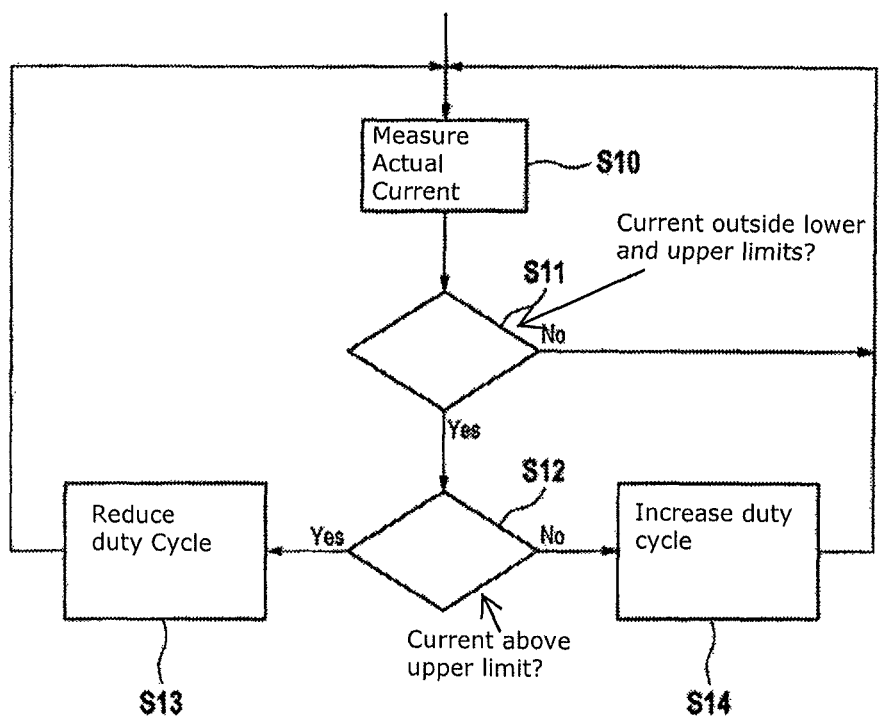

After determination of said starting duty cycle $DC_{mean}$ for the operating mode II, said operating mode follows the operating mode I, which can be implemented according to the method steps according to FIG. 4 and in which the load current $I_L$ is controlled between the upper current limit value $I_{SETPOINT,o,II}$ and the lower current limit value $I_{SETPOINT,u,II}$. For the operating mode II, FIG. 2 illustrates only an average load current $I_L$ controlled by the PWM.

The upper current limit value $I_{SETPOINT,o,I}$ of the first operating mode I is determined to be higher than the upper current limit value $I_{SETPOINT,o,II}$ of the second operating mode II, in particular in order to achieve a situation in which the average load current $I_L$ in the operating mode II runs approximately in the center between the current limit values, wherein the fact that the switch-on and switch-off behavior of the load current $I_L$ has an exponential profile and an average current is therefore lower than an average value between the upper $I_{SETPOINT,o,II}$ and the lower $I_{SETPOINT,u,II}$ current limit value is taken into account. The described procedure can likewise be applied in the case of a reduction in the setpoint current value $I_{SETPOINT}$, wherein there is preferably no provision for widening of the tolerance range, by appropriate determination of the lower current limit value $I_{SETPOINT,u,I}$, in order to prevent too low a load current $I_L$ in the operating mode I.

A more precise explanation of the calculation of the starting value of the duty cycle of the current control during the operating mode I is given below with reference to FIG. 3. According to the flow chart in FIG. 3, after the start, a check is first of all carried out in a first method step S1 to determine whether there is a change in the current setpoint value $I_{SETPOINT}$ in comparison with the preceding cycle. If no change has taken place, there is a switch to the operating mode II or said operating mode is retained. Instead, if a change has taken place, according to method step S2, a timer is started and a check is carried out to determine whether the current setpoint value $I_{SETPOINT}$ is greater than the current setpoint value $I_{SETPOINT,t-1}$ of the preceding cycle (S3).

If the current setpoint value $I_{SETPOINT}$ during the comparison in method step S3 is not less than or greater than the current setpoint value $I_{Setpoint,t-1}$ of the preceding cycle, that is to say the load current $I_L$ is intended to be increased, the load circuit 1 is closed in method step S4.1 by means of the FET transistor T1, so that there is an increase in the load current $I_L$ when the valve coil L is energized. The current actual value $I_{ACTUAL}$ is detected in each case at consecutive sampling times $t_{Si}$ (i=1, 2, ... ), which differ by a control pause duration Δt of, for example, 200 μs, and a check is then carried out in step S5.1 to determine whether the upper current limit value $I_{SETPOINT,o,I}$ has been reached or exceeded, wherein the check is cyclically repeated until an exceeding has been identified and subsequently the load current $I_L$ is switched off by means of corresponding actuation of the FET transistor T1 in method step S6.1 at least until the exceeding of a length of time or period duration set by means of the timer started in step S2, wherein, after the set length of time of the timer has been exceeded, the counting starts again, so that it is run through cyclically. After a length of time (S7.1), a check is carried out to determine whether the prescribed number of PWM periods generated in this way has been reached, wherein there is a return to method step S4.1 when further periods are envisaged. The number of periods generated in this way can preferably be adapted.

The average load current $I_L$ for the operating mode II is adjusted based on the current setpoint value $I_{SETPOINT}$ by means of said PWM periods. If the preset number N of periods is reached, in method step S9, a defined number of switch-on times $t_{on1}, t_{on2}, \ldots$ of the periods is used and the corresponding average duty cycle $DC_{mean}$ is calculated therefrom based on equation (1). Said corresponding average duty cycle is transmitted as the starting duty cycle to the current controller for the execution of the operating mode II. In this case, the lengths of time of the last two switch-on phases $t_{on1}, t_{on2}$ can be used, for example, to form an average value:

$$t_{on\_mean} = (t_{on1} + t_{on2})/2.$$

If the load current $I_L$ is intended to be reduced, that is to say the prescribed current setpoint value $I_{SETPOINT}$ during the comparison in method step S3 is lower than the current setpoint value $I_{SETPOINT,t-1}$ of the preceding cycle, the load circuit 1 is interrupted in method step S4.2 by means of the FET transistor T1, whereupon the load current is reduced, and in S5.2 a check is then carried out to determine whether the lower current limit value $I_{SETPOINT,u,I}$ has been undershot, wherein the check is repeated until an undershoot is identified and subsequently the load current $I_L$ is switched on (S7.2) for a prescribed length of time $t_{on1}, \ldots$ by means of appropriate actuation of the FET transistor T1 in method step S6.2. If the length of time $t_{on1}$ has been exceeded, a check (S8.2) is carried out to determine whether the prescribed number of periods generated in this way has been reached, wherein there is a return to method step S4.2 when further periods are provided. If the preset number N of periods has been reached, in method step S9, the duty cycle $DC_{mean}$ to be used for the operating mode II is calculated and transmitted to the current controller for execution of the operating mode II, as has already been described.

FIG. 4 shows a flow chart for explaining the current control in operating mode II. The manipulated variable that is used for readjustment is a fixed value in operating mode II. If the load current $I_L$ fluctuates within the current limits, the duty cycle is not changed. The time at which a control intervention is performed is linked to the sampling time of the current signal. According to the flow chart in FIG. 4, after the transmission of the starting value of the duty cycle, the current actual value $I_{ACTUAL}$ is first measured (S10) and in method step S11 a check is carried out to determine whether the load current value identified in this way is located within the lower $I_{SETPOINT,u,II}$ and upper current limit $I_{SETPOINT,o,II}$ of the operating mode II. If it is located within the limits, there is a return to step S10 and the current actual value $I_{ACTUAL}$ is measured again. In the case that the load current $I_L$ or the measured current actual value $I_{ACTUAL}$ is outside of the limits, in step S12 a check is carried out to determine whether said load current or measured current actual value is greater than the upper current limit $I_{SETPOINT,o,II}$ and, if this is the case, the duty cycle of the PWM is reduced (S13). If said load current or measured current actual value is not greater, the duty cycle is increased (S14).

The limit values $I_{SETPOINT,u}$ and $I_{SETPOINT,o}$ can also be combined according to a preferred configuration of an aspect of the invention to form a single current setpoint value in order to implement the control of the load current $I_{L,II}$ during the operating mode II with respect to said single current setpoint value, wherein continuous adjustment is performed by the control.

The invention claimed is:

1. A method for pulse-modulated (PWM) current control of a load current of an inductive load by at least one switching element for switching the load current, in which a first operating mode for operating the inductive load is implemented when a change in the current setpoint value has been effected, the method comprising:
    setting, in the first operating mode, during a present cycle, a switching state of the switching element depending on whether a current setpoint value of the load current in the present cycle is higher or lower than a current setpoint value of a directly preceding cycle,
    wherein when the current setpoint value of the load current in the present cycle is higher than the current setpoint value of the directly preceding cycle:
        the switching state is closed and retained until the current setpoint value of the load current in the present cycle is reached and is then opened,
        the opened switching state is retained for a predetermined amount of time, and is then closed,
        wherein the switching state of the switching element is switched between the opened and closed state multiple times to generate a prescribed number of periods,
    wherein when the current setpoint value of the load current in the present cycle is lower than the current setpoint value of the directly preceding cycle:
        the switching state is opened and retained until the current setpoint value of the load current in the present cycle is reached and is then closed,
        the closed switching state is retained for a predetermined amount of time, and is then opened,
        wherein the switching state of the switching element is switched between the opened and closed state multiple times to generate a prescribed number of periods, and
    determining the duty cycle of the pulse modulation based on at least a portion of the prescribed number of periods, said duty cycle being used as the initial duty cycle for the second operating mode.

2. The method as claimed in claim 1, wherein an average duty cycle is determined based on at least the portion of the prescribed number of periods, said average duty cycle being used as the initial duty cycle for the second operating mode.

3. The method as claimed in claim 1, wherein the initial duty cycle for use in the second operating mode is calculated using an average length of time of at least one of the switching states of the switching element over at least a portion of the number of periods.

4. The method as claimed in claim 1, wherein the initial duty cycle is calculated using an average switch-on time of the switching element over at least a portion of the number of periods.

5. The method as claimed in claim 1, wherein a period duration of the periods is prescribed by a timer.

6. The method as claimed in claim 1, wherein proceeding from an initial duty cycle identified in the first operating mode, the duty cycle during the second operating mode is prescribed taking into account the current setpoint value.

7. The method as claimed in claim 1, wherein in the second operating mode, a current actual value is determined, a control deviation from the current actual value and the current setpoint value is detected and the control deviation is used to calculate a duty factor of the pulse-width modulation.

8. An electronic circuit arrangement for the pulse-modulated current control of a load current of an inductive load comprising:
    at least one switching element for switching the load current; and
    a control circuit for actuating the switching element,
    wherein the circuit arrangement is configured to operate the inductive load in a first operating mode when a change in the current setpoint value has been effected,
    wherein, in the first operating mode, during a present cycle, a switching state of the switching element is set depending on whether a current setpoint value of the load current in the present cycle is higher or lower than a current setpoint value of a directly preceding cycle,
    wherein when the current setpoint value of the load current in the present cycle is higher than the current setpoint value of the directly preceding cycle:
        the switching state is closed and retained until the current setpoint value of the load current in the present cycle is reached and is then opened,
        the opened switching state is retained for a predetermined amount of time, and is then closed, and
        wherein the switching state of the switching element is switched between the opened and closed state multiple times to generate a prescribed number of periods,
    wherein when the current setpoint value of the load current in the present cycle is lower than the current setpoint value of the directly preceding cycle:
        the switching state is opened and retained until the current setpoint value of the load current in the present cycle is reached and is then closed, the closed switching state is retained for a predetermined amount of time, and is then opened, wherein the switching state of the switching element is switched between the opened and closed state multiple times to generate a prescribed number of periods, and the duty cycle of the pulse modulation is determined based on at least a portion of said periods, said duty cycle being used as the initial duty cycle (DC) for the second operating mode.

* * * * *